July 21, 1970 J. L. METZ 3,521,261

FLUX SENSITIVE MAGNETIC TRANSDUCER

Filed Nov. 10, 1966

INVENTOR
JACK L. METZ
BY R. C. Terry
ATTORNEY

United States Patent Office 3,521,261
Patented July 21, 1970

3,521,261
FLUX SENSITIVE MAGNETIC TRANSDUCER
Jack L. Metz, Des Plaines, Ill., assignor to Teletype Corporation, Skokie, Ill., a corporation of Delaware
Filed Nov. 10, 1966, Ser. No. 593,379
Int. Cl. G11b 5/34
U.S. Cl. 340—174.1                                  1 Claim

ABSTRACT OF THE DISCLOSURE

This invention relates to electromagnetic transducers and more particularly to electromagnetic transducers for determining the condition of a stationary or slowly-moving magnetic medium by positioning one end of a substantially straight magnetic core having an electrical winding, perpendicular to the record medium. The magnetic field of the record medium distorts the hysteresis curve of the core so that when an electrical signal of a fundamental frequency is impressed upon the winding a second harmonic of the signal is generated. A tuned detector is electrically connected to the winding for sensing the presence of the second harmonic manifesting the magnetic pole.

---

In reading magnetic tape, the tape is usually drawn past a magnetic sensing transducer or read-out head at a high speed, and the variously magnetized portions of the tape caused changes in the flux flowing through a core in the magnetic head. These changes of flux generate minute voltages in a coil placed around that core. In tapes carrying digital data in the form of uniformly-magnetized strips along the tape, it is often desirable to read these data at very slow tape speeds or even with the tape stopped. When the tape is stopped, there can be no change in the flux passing through the core of the read-out head unless external means are used to vary this flux.

Such external means for varying the flux flowing through the head are employed in what is known in the art as a flux-gate head. In this type of head a high-frequency chopping signal is applied to the core alternately to saturate and unsaturate local areas of the core in order to vary the otherwise steady flow of flux through the core. The signal-to-noise ratio of this type of head is very low and expensive amplification of the output is necessary to make it useful and reliable.

Another device for reading stationary or slowly moving tape is made by arranging a magnetic amplifier so that the control flux for the amplifier is supplied by the tape. This type of head also produces a low-level output signal.

It is an object of the present invention to sense a slowly moving or stationary magnetic record.

It is another object of the present invention to determine the position of a change in the magnetic polarity of information recorded on a magnetic medium.

It is yet another object of the present invention to produce a strong signal in proportion to the background noise generated in a sensing device for a slowly moving or stationary magnetic record.

It is a further object of the present invention to sense a stationary or slowly-moving magnetic record with a device that is inexpensive and simple to manufacture.

In accordance with the preferred embodiment of the present invention, an electromagnetic transducer having an electrical winding and a non-remanent ferromagnetic core with two magnetic poles is positioned with only one of these two magnetic poles adjacent a magnetic record. An excitation signal at a fundamental frequency is impressed upon the electrical winding.

Since an electromagnetic transducer is an inductor, it harmonically distorts the excitation signal by generating odd-numbered harmonics of the excitation signal and superimposing these harmonics upon it. A magnetic pole in the record causes a magnetic flux to flow in the core and causes the inductor to also generate even-numbered harmonics which are superimposed on the excitation signal. The amount of distortion of the excitation signal at the second harmonic of the fundamental frequency is detected and indicates the magnetic condition of that portion of the record positioned beneath the one pole of the transducer.

A more complete understanding of the present invention may be had by referring to the following detailed description when considered in conjunction with the accompanying drawing wherein.

Figure 1:
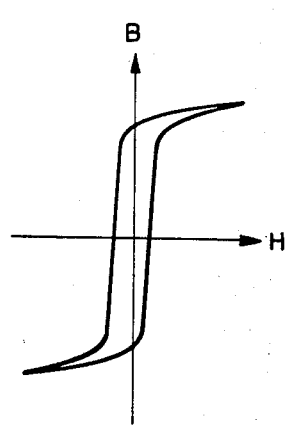
FIG. 1 is a typical hysteresis loop for a ferromagnetic material.

When a magnetomotive force (H) is applied to a ferromagnetic material, a magnetic flux (B) tends to flow in the material. Referring now to the drawings wherein like reference numbers designate the same parts in the several drawings and referring more particularly to FIG. 1, there is shown a graph of the relationship between magnetomotive force and flux for a typical ferromagnetic material, as the magnetomotive force is varied from one extreme to another. The area enclosed within the curve represents a loss of energy brought about by the change in the magnetization of the material and is known as "hysteresis" loss. Hence, the curve shown in FIG. 1 is known as a "hysteresis loop."

It can be observed from the typical hysteresis loop of FIG. 1, that most of the lines are curved and not linear. This indicates that if this ferromagnetic material were energized by different amounts of magnetomotive force, the amount of flux would not always be linearly proportional to the amount of magnetomotive force impressed upon the material. This nonlinearity between magnetomotive force and flux flow gives rise to a phenomenon known as "harmonic distortion." If a magnetomotive force signal that varies sinusoidally at a fundamental frequency is applied to this ferromagnetic material, the flux flowing through the material varies sinusoidally at the fundamental frequency but also has component fluxes superimposed upon it that vary sinusoidally at harmonics of the fundamental frequency.

Most magnetic materials have hysteresis loops which are generally symmetrical but of opposite polarity about both the B and H axes. In one half-cycle of the sinusoidal magnetomotive force, harmonic distortion of one polarity is generated. On the second half-cycle of the sinusoidal magnetomotive force, harmonic distortion of the other polarity is generated. In the case of a symmetrical hysteresis curve, the even-numbered harmonics of the fundamental frequency tend to cancel and the odd-numbered harmonics tend to be reinforced. Therefore, the harmonic distortion generated by an ideal piece of ferromagnetic material comprises only odd-numbered harmonics of the fundamental frequency.

Due to remanence, crystal structure imperfections of the material, etc. the hysteresis loop of FIG. 1 for a typical ferromagnetic material is slightly distorted so that it is not entirely symmetrical about its axes, and the even-numbered harmonics of the fundamental frequency do not completely cancel. Therefore, a non-remanent ferromagnetic material in the unmagnetized condition but having a slightly distorted or non-symmetrical hysteresis loop generates, in addition to odd-numbered harmonics, small distortion signals at even-numbered harmonics of the fundamental frequency, with the lower harmonics predominating. If a steady magnetomotive force is applied to the ferromagnetic material, it generates a magnetic flux within the material. This flux further distorts the hysteresis loop of the material, giving rise to an increase in the generation of even-numbered harmonics of the excitation signal.

Figure 2:
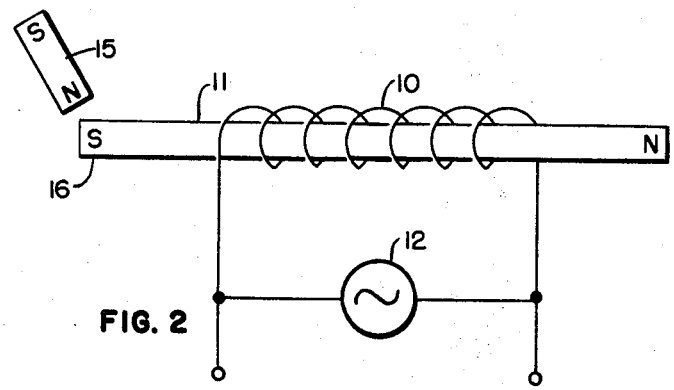
FIG. 2 is a schematic diagram of the magnetic transducer of the present invention.

The application of the principal of harmonic distortion generation to a physical structure will be more readily understood by referring to FIG. 2, wherein a coil 10 is wound around a core 11 of ferromagnetic material having high permeability and as little remanence as possible. A signal generator 12 delivers sinusoidal excitation signals to the coil at a fundamental frequency, and this excitation is applied to the core 11 in the form of a sinusoidally varying magnetomotive force. These signals from signal generator 12 are also supplied to the output terminals 13 of the coil 10. Harmonic distortion generated in the core 11 is superimposed upon this sinusoidal excitation signal and is also available at the output terminals 13. Since the hysteresis loop of the core 11 is not quite symmetrical about its axes, for the reasons discussed previously, a small amount of even-numbered harmonic distortion of the fundamental frequency is available at output terminals 13. Since higher harmonics are attenuated in the inductor, the second harmonic is the most noticeable even-numbered harmonic.

If one pole of a small permanent magnet 15 is positioned near one end 16 of the core 11, magnet 15 induces magnetic bias within the previously unmagnetized core 11. This changes the shape of the hysteresis loop (FIG. 1) of the ferromagnetic material of core 11 by increasing that portion of the loop located in one quadrant of the references frame of FIG. 1 and by corrspondingly decreasing the area of the loop in another quadrant. If the presence of a north pole in magnet 15 positioned near end 16 of core 11 generates a bias flux that adds to and increases the asymmetry of the hysteresis loop of the material of core 11, more distortion is generated at even-numbered harmonics of the frequency of the excitation signal even though the signal generated by signal generator 12 does not vary, and this increased distortion appears at output terminals 13. If the south pole of magnet 15 is then positioned near one end 16 of the core 11, the magnetic bias thus induced in nonremanent core 11 tends to neutralize some or all of the asymmetry of the hysteresis loop of the material of core 11 and less distortion is produced at the even-numbered harmonics of the fundamental frequency.

Unlike prior art static, data magnetic tape readers which develop maximum output between magnetic poles in a record medium, the present magnetic transducer develops maximum output when a magnetic pole in the record medium is positioned at end 16 of core 11. This is particularly useful for accurately determining the position of magnetic poles within a magnetic record.

Figure 3:
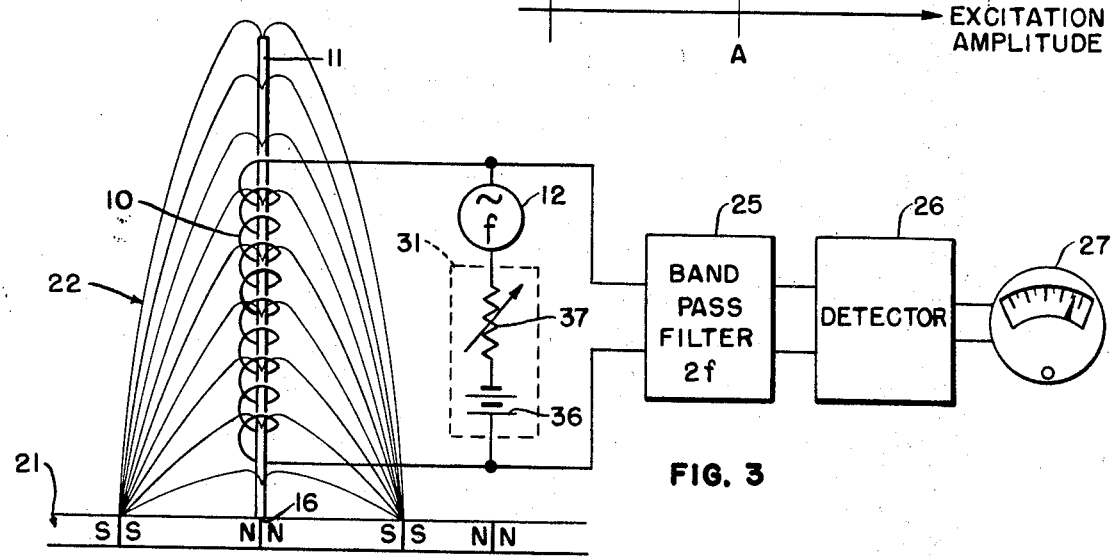
FIG. 3 is a schematic diagram of the magnetic transducer and its associated circuitry arranged for sensing a magnetic record.

In FIG. 3 the core 11 and coil 10 of FIG. 2 are shown arranged so as to read data recorded on a strip of magnetic tape. This tape comprises a dielectric substrate 20 on which there is bonded a strip 21 of magnetic material having high remanence. For data recording, strip 21 is magnetized in a tape recorder, in a manner well known in the art, in such a way that magnetic poles exist in the strip 21 generally as shown by way of example in FIG. 3. The one end 16 of core 11 is positioned adjacent the strip 21, and the magnetic poles in strip 21 have the same effect on core 11 that magnet 15 (FIG. 2) had. When end 16 is positioned between two poles along strip 21, very little external magnetic bias flux flows in the core 11; but when end 16 is positioned over a magnetic pole in strip 21—whether a north pole or a south pole— a significant amount of flux flows through the core 11 and returns to the opposite poles on either side of the pole adjacent to end 16 as shown by the flux lines 22. This bias flux changes the shape of the hysteresis loop of the material of core 11. When the end 16 of the core 11 is positioned over a portion of the tape that contains no magnetic pole (FIG. 3), only a small amount of residual magnetic bias flux flows through the core 11. This is the quiescent condition of core 11.

An excitation signal is generated by signal generator 12 and passes through coil 10. This excitation signal (which was chosen as 227.5 kilocycles per second) is distorted by the inductor formed by core 11 and coil 10. The second harmonic of the 227.5 kilocycle excitation signal is the only signal that passes through a 455 kilocycle band-pass filter 25. This 455 kilocycle signal from filter 25 is rectified and filtered by detector 26 and is then available for use by a utilization device (a DC voltmeter 27 in this embodiment).

Different amplitudes of excitation signal produced by signal generator 12 produces substantially proportionate amounts of distortion at the second harmonic of the excitation signal. The approximately linear relationship between the amplitude of excitation and the amplitude of the distortion thus generated is valid as long as excitation is kept within the extremes of saturation of the core material and is shown by line 30 in the graph of FIG. 4. A bias network 31 is provided in the excitation circuit to deliver a DC bias current from a battery 36 through a variable resistor 37 to the coil 10 in order to provide another source of bias flux for the core 11 besides the magnetic pole in strip 21. Bias flux that is generated by bias network 31 can aid or oppose the small distortion of the hysteresis loop of core 11 that is characteristic of the unmagnetized ferromagnetic material. Adjustment of bias network 31 by varying the resistance of resistor 37 therefore increases or decreases the amount of distortion generated by the transducer in the quiescent condition when there is no magnetic pole in the portion of strip 21 that is positioned under end 16 of core 11. Thus, adjustment of the bias network 31 increases or decreases the slope of line 30 in the graph of FIG. 4, and line 30 is shown with a slope that is largely the result of a substantial bias current through coil 10.

When, in the operation of the transducer shown in FIG. 3, the end 16 of core 11 is positioned over a north magnetic pole in strip 21, the asymmetry of the hysteresis loop of core 11 is increased (a north pole was assumed to increase asymmetry of the hysteresis loop of the material of core 11). Therefore, there is an increase in the amplitude of the 455 kilocycle signal available at terminals 13 for a given amplitude of excitation, such as the amplitude A shown in FIG. 4, and meter 27 shows this increased signal strength.

Figure 4:
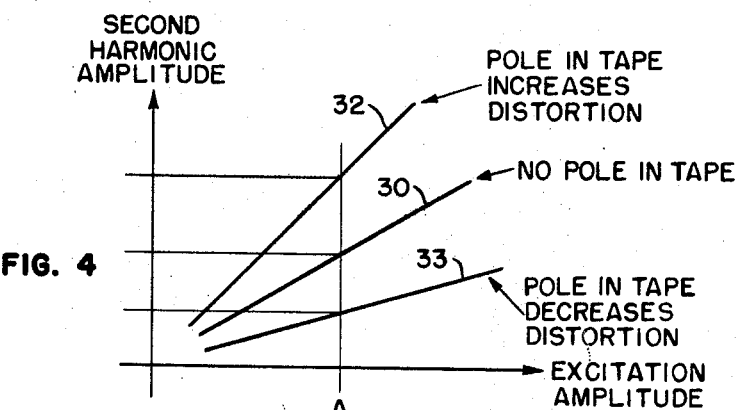
FIG. 4 is a graph of the distortion of the input excitation signal by the magnetic transducer for different intensities of excitation and magnetic bias.

This change of the amount of second harmonic distortion generated by the presentation of a north pole to end 16 of core 11 is represented on the graph of FIG. 4 by a change from line 30 to line 32 along the line of constant excitation amplitude A. When this north pole in strip 21 is held beneath end 16 of core 11, changes in the amplitude of the excitation signal from signal generator 12 cause changes in the amount of second harmonic distortion generated, according to the line 32 on the graph of FIG. 4.

In the normal operation of the transducer, the amount of excitation signal from signal generator 12 is held constant for example, at amplitude A; and the amount of bias current from bias network 31 is also held constant, keeping the slope of line 30 of FIG. 4 unchanged. Therefore, changes in the amount of second harmonic distortion signal generated are brought about only by changes in the signal flux flowing in core 11 as a result of magnetic poles in strip 21.

When the end 16 of core 11 (FIG. 3) is positioned over a south pole in the strip 21, the hysteresis loop of the material of core 11 is thereby made more symmetrical (in the example under consideration). This causes a decrease in the amplitude of the 455 kilocycle signal generated by core 11, and the meter 26 indicates this reduced signal strength. The amplitude of the second harmonic signal that is generated in response to different amplitudes of the excitation signal when a south pole is presented to end 16 of core 11 is shown by line 33 in FIG. 4.

Figure 5:
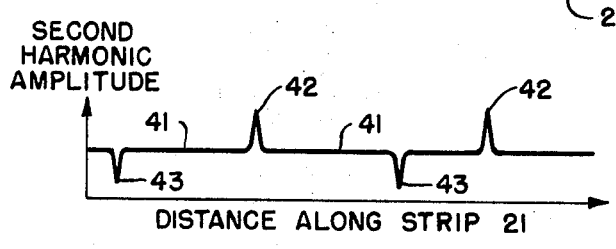
FIG. 5 is a graphical representation of the quantity of harmonic distortion produced with the sample of tape shown in FIG. 3.

As stated previously, when an excitation signal having an amplitude A is delivered to coil 10 and a magnetic pole is not positioned beneath end 16 of core 11, a second harmonic signal is generated that has an amplitude that is indicated by the intersection of line A and line 30. When a south pole in strip 21 is positioned below end 16 of core 11, however, a second harmonic signal is generated that has an amplitude indicated by the intersection of line A and line 33. The ordinate of the graph of FIG. 5 shows the amount of distortion generated when end 16 of core 11 is positioned over different portions of the magnetic strip 21 which are represented on the abscissa of the graph. Line 41 of the graph of FIG. 5 is a representation of the level of harmonic distortion and is at the quiescent amplitude over most of the length of strip 21. Maxima 42 represent increased distortion generated when a north pole is positioned beneath end 16 of core 11, and minima 43 represent reduced distortion generated when a south pole is positioned beneath end 16 of core 11.

If resistor 37 is adjusted so that there is no 455 kilocycle signal generated when end 16 of core 11 is positioned between magnetic poles in strip 21, there is a significant amplitude of 455 kilocycle signal generated only when end 16 of core 11 is positioned over a pole in the tape.

This occurs when bias circuit 31 is adjusted so that line 30 of FIG. 4 is no slope but lies along the abscissa of the graph of FIG. 4. Since detector 26 is a rectifier, any amplitudes of harmonic distortion that would appear to lie below the abscissa are indistinguishable from harmonic distortion of the same magnitude that is represented above the abscissa in FIG. 4.

Although only one embodiment of the invention is shown in the drawings and described in the foregoing specification, it will be understood that invention is not limited to the specific embodiment described, but is capable of modification and rearrangement and substitution of parts and elements without departing from the spirit of the invention.

What is claimed is:

1. A transducer system comprising: a magnetic record medium having magnetized areas extending along the length of the record medium, each magnetized area being bounded by magnetic poles;
   an electromagnetic transducer having an electrical winding on a substantially straight ferromagnetic rod having two ends, only one of which is positioned adjacent to and substantially perpendicular to the record medium;
   an oscillator for generating signals at a fundamental frequency with the output of the oscillator connected to the electrical winding of the transducer; and
   a tuned detector connected to the electrical winding of the transducer for detecting signals at a harmonic of the fundamental frequency; the output of the tuned detector exhibiting maxima and minima in amplitude when said one end of the rod is positioned immediately adjacent said magnetic poles.

References Cited

UNITED STATES PATENTS

| 2,485,931 | 10/1949 | Slonczewski | 324—43 |
| 3,239,823 | 3/1966 | Chang | 179—100.2 |
| 3,164,684 | 1/1965 | Weigand | 179—100.2 |
| 3,016,427 | 1/1962 | Grant | 179—100.2 |

OTHER REFERENCES

W. A. Geyger: Magnetic Amplifier Circuits, McGraw-Hill Book Co., New York, 1957, pp. 264–267.

W. A. Geyger: Magnetic Amplifier Circuits, McGraw-Hill Book Co., New York, 1957, pp. 322, 323.

BERNARD KONICK, Primary Examiner

J. I. ROSENBLATT, Assistant Examiner

U.S. Cl. X.R.

179—100.2